Aug. 12, 1947.                F. P. WAGNER                2,425,707
                              SHANK STIFFENER
                            Filed Sept. 8, 1945

INVENTOR
FREDERICK P. WAGNER

BY
ATTORNEYS

Patented Aug. 12, 1947

2,425,707

UNITED STATES PATENT OFFICE 2,425,707

SHANK STIFFENER

Frederick P. Wagner, Normandy, Mo., assignor to Brauer Brothers Shoe Company, St. Louis, Mo., a corporation of Missouri Application September 8, 1945, Serial No. 615,208

3 Claims. (Cl. 12—146)

This invention relates to an improved shank stiffener for shoes and more particularly to the method by which such stiffener is embodied in the shoe.

The object of the invention, generally stated, is to provide a process of shoe manufacturing wherein the shanking is accurately self-conforming to the arch curvature of the last.

A more specific object of the invention is to provide a process of shoe manufacture wherein plastic shanking is employed and conformed without subjecting the shoe to external pressure operations.

The invention will now be explained with reference to the accompanying drawings, in which.

In accordance with the present invention, the usual process of shoe making is followed to the point of application of the shank stiffener. The present invention contemplates that the shank be stiffened with a thermoplastic material having the requisite flexual strength of at least 5,000 pounds per square inch, and which plastic material is capable of being rendered fluid, so that it may be extruded at temperatures which will have no deleterious effect upon the materials of which the shoe is constructed. Such plastic material, in accordance with the present invention, is applied to the shoe from an extruding apparatus under such conditions of fluidity that the material will readily and accurately conform itself to the shape of the cavity remaining in the shoe-bottom for the reception of a shank stiffener and will set in situ. For example, such thermoplastic materials as polystyrene, methyl methacrylate, "Ethocel," "Saran," "Lumarith," "Tenite," "Styron," and the like may be utilized. These materials are thermoplastic and when set provide sufficient rigidity for the shoe shank. These materials, when applied as herein disclosed, adhesively unify the various layers of the shoe-bottom.

The present invention especially contemplates that the aforesaid thermoplastic materials be heated to reduce them to a physical condition in which they may be extruded and that such operation be carried out in immediate proximity to the location at which the material is extruded in the form of a strip or ribbon and, while still in a flowable condition, deposited directly upon the bottom of the shoe in the shank portion.

Obviously, the shoe-bottom, as, for example, the overlasted portions of the upper and that portion of the insole which is to be in contact with the plastic shank stiffener, may be pretreated so as to be readily wet by the thermoplastic material. For example, such pretreatment may consist of the application of a solution of the thermoplastic with or without scuffing the layers to be contacted.

Referring now to Figures 1 to 4, inclusive, for an illustrative embodiment of the present invention, the usual process of shoe making is followed in the assembly, lasting, and securing of an upper 1 and an insole 2, which, in accordance with the usual practice at this stage of the operations, are mounted upon a last 6. The parts are assembled in such manner as to leave a cavity 3 for the reception of a shank stiffener.

Figure 1:
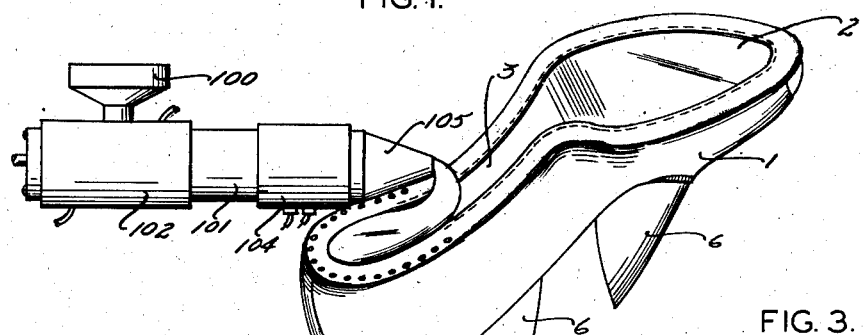
Figure 1 is a perspective view of a lasted, unbottomed shoe in the process of having the shanking applied in accordance with the present invention.
Figure 3:
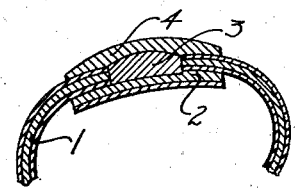
Figure 3 is a cross-section of the completed shoe, taken through the shank.
Figure 2:
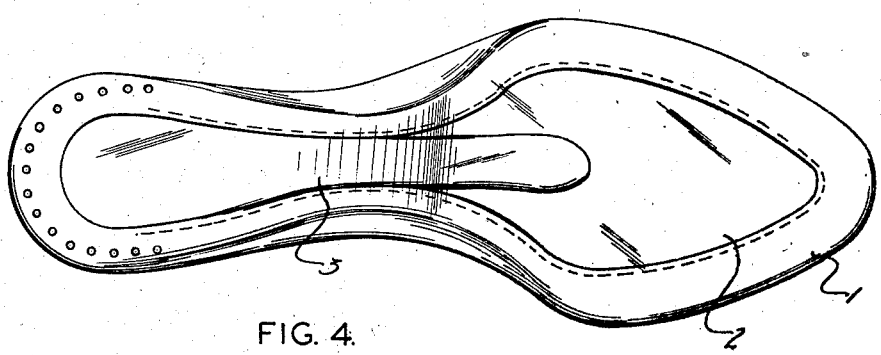
Figure 2 is a bottom view of a shoe in the condition immediately following the application of the shanking in accordance with the present invention.
Figure 4:
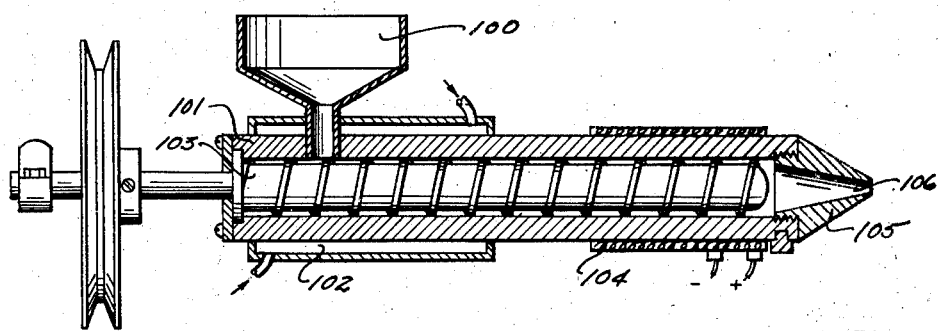
Figure 4 is a longitudinal sectional view of apparatus suitable for use in applying the shanking, as shown generally in Figure 1.

With the shoe in this condition, an extruded ribbon of the thermoplastic material is applied to the cavity 3. The present invention contemplates the provision of an extruding apparatus, such, for example, as that shown in Figure 4. Such an apparatus consists of a hopper 100 adapted to receive the plastic material in powdered or other finely divided condition. From the hopper 100, the plastic material is fed into a barrel 101 having a suitable cooling arrangement, such, for example, as a water jacket 102. Through the barrel 101, a screw 103 extends and is suitably driven so as to advance the plastic material from left to right, as shown in Figure 4. Adjacent the right or exit end of the barrel 101, suitable heating means, such as a coil 104, may be provided so as to maintain the thermoplastic material in physical condition such as to facilitate extrusion. The extreme right end of the barrel 101 is provided with a nozzle 105 having an aperture 106 of a cross-sectional shape desired to provide the extruded ribbon with a shape most readily adapted for the purpose. For example, such ribbon may be of rectangular cross-section or of oval cross-section.

From the nozzle 106, the ribbon of extruded material is fed directly into the space 3 provided in the bottom of the shoe. While in condition where it is still sufficiently flowable to conform itself to the contour of the bottom of the shoe, but of sufficient viscosity that it does not substantially creep from the position in which it is deposited on the bottom of the shoe, the thermoplastic material stays in position. The optimum temperature of extrusion is, of course, subject to variation dependent upon the nature of the plastic material, the atmospheric conditions, and the skill and speed of the operator. In practice the operation may be commenced with an extrusion temperature of about 375° F. and the temperature then adjusted up or down until, by trial, the desired flowability is achieved. As indicated hereinbefore, if the character of the materials utilized in constructing the shoe are not such as to be readily wet by the thermoplastic material, the preliminary treatment of such surfaces by painting with a solution of the thermoplastic will facilitate the wetting and cause adhesion to the shoe materials by the thermoplastic. A property of the thermoplastic materials which particularly recommends their use for shank stiffeners in accordance with this invention is that they suffer no substantial shrinkage upon cooling from the extrusion temperatures described. Once deposited, if the amount be properly estimated, the thermoplastic cools and sets so as to adequately fill the entire shank and heel space 3.

After the thermoplastic has been thus applied to the cavity 3, the outsole 4 may be immediately applied and, as in the case of the other materials of the shoe-bottom, may be pretreated with a solution of the thermoplastic in a volatile organic solvent, to facilitate wetting and the consequent adhesive unification of the several layers of the shoe-bottom by the thermoplastic.

In the event that a surplus of the thermoplastic material has been extruded upon the shoe, the thermoplastic may be permitted to set and the excess ground or sanded away before the outsole is applied. In the latter instance, the set thermoplastic is preferably treated with the solution of thermoplastic immediately prior to the application of the outsole.

If desired, the thermoplastic material may be reinforced by providing some reinforcing medium such as wire, wire mesh, wood, metal, fabric, or granular material in the cavity 3 before the thermoplastic shanking is applied. The fluid thermoplastic flows around the reinforcing material, cools, hardens, and completely fills the shoe shank with a reinforced solid body possessing the necessary flexual strength for the support of the shank. The use of such reinforcing materials enables the utilization of thermoplastics having lower flexual strengths than those required when such reinforcing is not used, but a closer control of the fluidity of the extruded mass is necessary.

From the foregoing description, it should be apparent that, when the shanking is applied as above described, it is sufficiently fluid that it accurately conforms itself to the curvature of the arch portion of the last upon which the shoe is situated and that no external pressure or other extrinsic means are required in order to cause the shank to accurately assume such shape. The quantity of thermoplastic material applied is preferably regulated in accordance with the size of the cavity in each particular shoe being operated upon, which, it will be understood, may vary from shoe to shoe, but the optimum condition to be sought for is to deposit enough of the thermoplastic material into position to fill the cavity without excess requiring removal before the bottom is applied.

While in the foregoing description, the preferred procedure has been described in detail, it is to be understood that the invention is not limited to the precise details described, but that many modifications and variations are contemplated by and within the scope of the appended claims.

Having thus described the invention, what is claimed as new and desired to be secured by Letters Patent is:

1. In the art of shoe making, the process comprising assembling and securing an upper and insole to provide an open space between the inturned edges of the upper at the shank, providing an extrudable plastic material which when set has a flexual strength of at least 5,000 pounds per square inch, extruding the plastic into space unconfined, and depositing an elongated, coherent increment of the extruded plastic in the shank space without permitting the plastic to set, and thereafter applying an outsole over the deposited plastic.

2. In the art of shoe making, the process comprising assembling an upper and an insole upon a last so as to provide an open space between the inturned edges of the upper at the shank for the reception of a shank stiffener, extruding heat plasticized thermoplastic material which when set has a flexual strength of at least 5,000 pounds per square inch, and depositing an elongated, coherent increment of the extruded plastic in said space without permitting the material to set, and thereafter applying an outsole over the deposited plastic.

3. In the art of shoe making, the process comprising providing an assembled upper and insole upon a last having an open space between the inturned edges of the upper at the shank for the reception of a shank stiffener, wetting the shank space with a solution of a thermoplastic, extruding heat plasticized thermoplastic material which when set has a flexual strength of at least 5,000 pounds per square inch, and depositing an elongated, coherent increment of the extruded plastic upon the solution-wet shank stiffener space without permitting the material to set, and thereafter applying an outsole over the deposited plastic.

FREDERICK P. WAGNER.

REFERENCES CITED

The following references are of record in the file of this patent:

UNITED STATES PATENTS

| Number | Name | Date |
| --- | --- | --- |
| 2,173,971 | Lancaster | Sept. 26, 1939 |